(12) United States Patent
Kim et al.

(10) Patent No.: US 10,714,740 B2
(45) Date of Patent: *Jul. 14, 2020

(54) CATHODE ACTIVE MATERIAL FOR LITHIUM SECONDARY BATTERY AND LITHIUM SECONDARY BATTERY COMPRISING THE SAME

(71) Applicant: ECOPRO BM CO., LTD., Cheongju-si, Chungcheongbuk-do (KR)

(72) Inventors: Jik Soo Kim, Chungcheongbuk-do (KR); Moon Ho Choi, Chungcheongbuk-do (KR); Jin Kyeong Yun, Chungcheongbuk-do (KR); Jae Yong Jung, Chungcheongbuk-do (KR); Suk Yong Jeon, Chungcheongbuk-do (KR); Jong Seung Shin, Chungcheongbuk-do (KR)

(73) Assignee: ECOPRO BM CO., LTD., Cheongju-si, Chungcheongbuk-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/897,934

(22) PCT Filed: Jan. 21, 2015

(86) PCT No.: PCT/KR2015/000646
§ 371 (c)(1),
(2) Date: Dec. 11, 2015

(87) PCT Pub. No.: WO2016/021791
PCT Pub. Date: Feb. 11, 2016

(65) Prior Publication Data
US 2016/0181597 A1    Jun. 23, 2016

(30) Foreign Application Priority Data

Aug. 7, 2014    (KR) .................... 10-2014-0101843

(51) Int. Cl.
*H01M 4/36* (2006.01)
*H01M 4/525* (2010.01)
(Continued)

(52) U.S. Cl.
CPC ........... *H01M 4/366* (2013.01); *H01M 4/505* (2013.01); *H01M 4/525* (2013.01); *H01M 4/582* (2013.01);
(Continued)

(58) Field of Classification Search
None
See application file for complete search history.

(56) References Cited

U.S. PATENT DOCUMENTS

| 6,040,090 A | 3/2000 | Sunagawa et al. |
| 2009/0029253 A1* | 1/2009 | Itou ................. H01M 4/525 429/223 |

(Continued)

FOREIGN PATENT DOCUMENTS

| CN | 101167209 A | 4/2008 |
| EP | 0918041 A1 | 5/1999 |

(Continued)

OTHER PUBLICATIONS

International Search Report in International Application No. PCT/KR2015/000646, filed Jan. 21, 2015.
(Continued)

*Primary Examiner* — Wojciech Haske
(74) *Attorney, Agent, or Firm* — Saliwanchik, Lloyd & Eisenchenk

(57) ABSTRACT

The present invention relates to a cathode active material for lithium secondary battery and a lithium secondary battery including the same, and more specifically it relates to a cathode active material for lithium secondary battery in which the lithium ion diffusion path in the primary particles
(Continued)

is formed to exhibit directivity in the center direction of the particles, and a lithium secondary battery including the same. The cathode active material for lithium secondary battery of the present invention has a lithium ion diffusion path exhibiting specific directivity in the primary particles and the secondary particles, and thus not only the conduction velocity of the lithium ion is fast and the lithium ion conductivity is high but also cycle characteristics are improved as the crystal structure hardly collapses despite repeated charging and discharging.

13 Claims, 4 Drawing Sheets

(51) Int. Cl.
    *H01M 4/505*     (2010.01)
    *H01M 4/58*      (2010.01)
    *H01M 4/02*      (2006.01)
    *H01M 10/0525*   (2010.01)

(52) U.S. Cl.
    CPC ...... *H01M 4/5825* (2013.01); *H01M 10/0525* (2013.01); *H01M 2004/021* (2013.01); *H01M 2004/027* (2013.01); *H01M 2220/20* (2013.01); *H01M 2220/30* (2013.01); *Y02E 60/122* (2013.01)

(56) References Cited

U.S. PATENT DOCUMENTS

| | | | |
|---|---|---|---|
| 2014/0158932 A1* | 6/2014 | Sun | ........................ H01M 4/13 252/182.1 |
| 2016/0218350 A1 | 7/2016 | Noh et al. | |

FOREIGN PATENT DOCUMENTS

| | | | |
|---|---|---|---|
| JP | 2000-227858 A | | 8/2000 |
| JP | 2013-517599 A | | 5/2013 |
| JP | 2014-067694 A | | 4/2014 |
| KR | 10-2005-0083869 A | | 8/2005 |
| KR | 20070097923 A | | 10/2007 |
| KR | 10-2007-0116158 A | † | 12/2007 |
| KR | 20130111413 A | | 10/2013 |
| KR | 10-2013-0138073 A | † | 12/2013 |
| KR | 10-2013-0138147 A | | 12/2013 |
| WO | WO-2006/118279 A1 | | 11/2006 |
| WO | WO-2013183974 A1 | | 12/2013 |

OTHER PUBLICATIONS

Third Party Submission dated Jan. 31, 2018 received in Japanese Application No. 2017-527519, along with its English translation.

\* cited by examiner
† cited by third party example 1 example 2 example 3 example 4 example 5 comparative example 1 example 1 example 2 example 3 example 4 example 5 comparative example 1

(Layered Structure)

aspect ratio [L/W or L/((W1+W2)/2)] > 1

CATHODE ACTIVE MATERIAL FOR LITHIUM SECONDARY BATTERY AND LITHIUM SECONDARY BATTERY COMPRISING THE SAME

CROSS-REFERENCE TO RELATED APPLICATION

This application is the U.S. national stage application of International Patent Application No. PCT/KR2015/000646, filed Jan. 21, 2015, which claims priority to Korean Application No. 10-2014-0101843, filed Aug. 7, 2014, the disclosures of each of which are incorporated herein by reference in their entirety.

TECHNICAL FIELD

The present invention relates to a cathode active material for lithium secondary battery and a lithium secondary battery including the same, and more specifically it relates to a cathode active material for lithium secondary battery in which the lithium ion diffusion paths in the primary particles and secondary particles of the cathode active material having a layered structure are formed to exhibit directivity in a specific direction, and a lithium secondary battery including the same.

BACKGROUND ART

Recently, interest in the energy storage technology has been increased. The effort to research and develop an electrochemical device has been gradually materialized as the application field of the energy storage technology has been expanded to a mobile phone, a camcorder, a notebook PC, and an electric vehicle. The electrochemical device is a field which attracts the most attention in this respect, and in particular, the development of a secondary battery capable of being charged and discharged is the focus of attention.

Among the secondary batteries which are currently applied, the lithium ion battery developed in the early 1990s has been widely used as a power source or portable apparatuses since it was developed in 1991 as a small battery, a light-weight battery, and a large capacity battery. The lithium secondary battery is in the spotlight due to its advantages that the operating voltage is higher and the energy density is far greater as compared to batteries of prior art, such as a Ni-MH battery, a Ni—Cd battery, and a sulfuric acid-Pb battery which use an aqueous electrolytic solution. In recent years, researches particularly on the power source for electric vehicle, in which an internal combustion engine and a lithium secondary battery are hybridized, have been actively carried out in the US, Japan, Europe, and the like.

However, a nickel-hydrogen battery has been used so far from the viewpoint of safety although the use of a lithium ion battery as a large-sized battery for an electric vehicle is considered from the viewpoint of the energy density. The greatest problem to be solved in order to use the lithium ion battery as a power source for electric vehicle is a high price and safety. In particular, the anode active material such as $LiCoO_2$ or $LiNdO_2$ which is currently commercialized and used has a disadvantage that the structure thereof drastically changes when the battery in an overcharged state is heated at from 200 to 270° C., and such a structural change leads to a reaction to release oxygen in the lattice, thus the crystal structure is instable due to the delithiation during charging, and the thermal properties significantly deteriorates.

In order to improve this problem, a part of nickel is substituted with a transition metal element so as to slightly shift the temperature at which the heat generation starts to a higher temperature or to prevent drastic heat generation, and other measures are attempted. The material, $LiNi_{1-x}Co_xO_2$ (x=0.1 to 0.3), obtained by substituting a part of nickel with cobalt exhibits excellent charge and discharge characteristics and lifespan characteristics but still has a problem of thermal stability. In addition, a number of technologies related to the composition and production of a Li—Ni—Mn-based composite oxide obtained by substituting a part of Ni with Mn which exhibits excellent thermal stability or a Li—Ni—Mn—Co-based composite oxide obtained by substituting a part of Ni with Mn and Co are known, and a new-concept anode active material has been recently disclosed in Japanese Patent Application. Laid-Open No. 2000-227858 in which not $LiNiO_2$ or $LiMnO_2$ is partially substituted with a transition metal but Mn and Ni compounds are uniformly dispersed in the atomic level to form a solid solution.

According to European Patent 0,918,041 or U.S. Pat. No. 6,040,090 on the composition of a Li—Ni—Mn—Co-based composite oxide obtained by substituting Ni with Mn and Co, $LiNi_{1-x}Co_xMn_yO_2$ (0<y≤0.3) exhibits improved, thermal stability as compared to an existing material which is composed of only Ni and Co but still has a problem of thermal stability as a Ni-based material.

In order to solve this disadvantage, a patent on a lithium transition metal oxide having a concentration gradient in the metal composition is proposed in Korea Patent Application. No. 10-2005-7007548. However, by this method, the lithium transition metal oxide can be synthesized so as to have different metal compositions in the inner layer and the outer layer but the metal composition is not continuously and gradually changed in the anode active material thus produced. A gradual gradient of metal composition may be achieved through the heat treatment process, but the interfacial resistance generated between the inner layer and the outer layer may acts as a resistance to inhibit the diffusion of lithium in the particles and this may lead to the deterioration in lifespan characteristics. Moreover, the composition of the inner layer is LCO, Co rich NCM, or a NCM-based material having a nickel content of 60% or less, and the total nickel content is also low, and thus it is difficult to realize a high capacity.

In addition, the powder synthesized by this invention has a low tap density since ammonia of a chelating agent is not used therein, and thus this powder is unsuitable to be used as an anode active material for lithium secondary battery required to have a high energy density.

DISCLOSURE OF THE INVENTION

Technical Problem

The present invention is made in order to solve the above problem, and an object thereof is to provide a cathode active material for lithium secondary battery, which has a new structure in which the lithium ion diffusion paths in the primary particles and secondary particles of the cathode active material having a layered structure exhibit specific directivity.

Another object of the present invention is to provide a lithium secondary battery including the cathode active material for lithium secondary battery of the present invention.

Technical Solution

In order to achieve the above object, the present invention provides a cathode active material for lithium secondary battery which includes secondary particles formed by aggregation of primary particles and in which a lithium ion diffusion path in the primary particles, namely, the axis a or b in the layered structure is formed in a center direction of the secondary particles.

The structures of the primary particles and secondary particles of the cathode active material for lithium secondary battery according to the present invention are illustrated as schematic diagrams in FIG. 6 and FIG. 7. As illustrated in FIG. 6 and FIG. 7, in the cathode active material for lithium secondary battery according to the present invention, the lithium ion diffusion path in the primary particles, namely, the axis a or b in the layered structure is formed in a line and exhibits directivity in the center direction of the secondary particles.

In the cathode active material for lithium secondary battery according to the present invention, an aspect ratio of the primary particles is 1 or more and a lithium ion diffusion path in the primary particles is formed in a longitudinal direction of the particles. In other words, in the cathode active material for lithium secondary battery according to the present invention, the lithium ion diffusion path is formed in the longitudinal direction, thus the lithium ion moves into the primary particles in the lateral direction having a relatively small area when the lithium ion moves into the primary particles of the cathode active material during charging and discharging and the collapse of the crystal structure due to repeated charging and discharging occurs in a relatively small area, and as a result, structural stability is exhibited.

In the cathode active material for lithium secondary battery according to the present invention, an area occupied by primary particles having the aspect ratio of 1 or more and the lithium ion diffusion path in the particles formed in a longitudinal direction of the particles is 20% or more of a total area.

In the cathode active material for lithium secondary battery according to the present invention, the aspect ratio is defined as L/W (L: length, W: width) in a case in which the particles have a rectangular shape and it is defined as L/(W1+W2)/2 in the case of having two lateral lengths of W1 and W2 as illustrated in FIG. 6.

In the cathode active material for lithium secondary battery according to the present invention, an area occupied by primary particles having a lithium ion diffusion path directed toward a center direction of the secondary particles is 40% or more of a total area of the particles. In the cathode active material for lithium secondary battery according to the present invention, a lithium ion diffusion path in the primary particles inclines by +/−45° or less with respect to a center direction of the secondary particles. In other words, in the cathode active material for lithium secondary battery according to the present invention, although the lithium ion diffusion path in the primary particles is directed toward the center of the secondary particles, it is not mechanically arranged in the dead center direction of the secondary particles but has a degree of freedom in arrangement within +/−45° in the center direction of the secondary particles.

In the cathode active material for lithium secondary battery according to the present invention, the primary particles are formed to exhibit directivity in a center direction of the entire particles, a lithium ion diffusion path in the primary particles is formed in a center direction of the entire particles, and thus a lithium ion diffusion path from a surface to a center of the secondary particles has a one-dimensional or two-dimensional tunnel structure.

Such primary particles having different aspect ratios may have a needle shape, a plate shape, a rectangular shape, a slanted rectangular shape, or a circular column shape.

By such a lithium ion diffusion path, not only the conduction velocity of the lithium ion is fast and the lithium ion conductivity is high but also the cycle characteristics are improved as the crystal structure hardly collapses despite repeated charging and discharging.

In addition, in the cathode active material for lithium secondary battery according to the present invention, the charge transfer resistance, diffusion, migration, and convection between the active material particles and the lithium ions or between the electrolytes are decreased by the lithium ion diffusion path formed in a one-dimensional tunnel structure of a linear path or a two-dimensional tunnel structure of a plane path, and thus the internal impedance of the battery can be significantly decreased.

In the cathode active material for lithium secondary battery according to the present invention, the secondary particles includes a core layer that is represented by the following Formula (1) and has a constant transition metal concentration; a concentration gradient layer that is formed on the periphery of the core layer and has a concentration gradient due to a continuously change in concentration of one or more transition metals; and a shell layer that is represented by the following Formula (2), is formed on the periphery of the concentration gradient layer, and has a constant transition metal concentration.

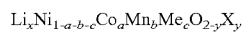  <Formula 1>

(In Formula 1, $0.9 \le x \le 1.15$, $0 \le a \le 0.20$, $0 \le b \le 0.20$, $0 \le c \le 0.1$, $0 \le y \le 0.1$, Me is at least one or more elements selected from the group consisting of Al, Mg, B, P, Ti, Si, Zr, Ba and any combination thereof, and X is at least one or more elements or molecules selected from the group consisting of anions of F, $BO_3$, and $PO_4$.)

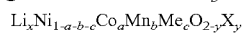  <Formula 2>

(In Formula 2, $0.9 \le x \le 1.15$, $0 \le a \le 0.50$, $0 \le b \le 0.6$, $0 \le c \le 0.2$, $0 \le y \le 0.1$, Me is at least one or more elements selected from the group consisting of Al, Mg, B, P, Ti, Si, Zr, Ba and any combination thereof, and X is at least one or more elements or molecules selected from the group consisting of anions of F, $BO_3$, and $PO_4$.)

In the cathode active material for lithium secondary battery according to the present invention, a thickness of the shell layer is from 0.05 to 2.0 μm.

In the cathode active material for lithium secondary battery according to the present invention, a lithium ion diffusion path of primary particles of the concentration gradient layer is directed toward a center direction of the secondary particles.

The present invention also provides a lithium secondary battery including the cathode active material for lithium secondary battery according to the present invention.

Advantageous Effects

In the cathode active material for lithium secondary battery according to the present invention, the lithium ion diffusion path in the primary particles is formed to exhibit directivity toward the center direction of the particles, thus the storage of the lithium ion into and release thereof from the primary particles are facilitated, and the capacity, output, and lifespan characteristics of the battery including the cathode active material for lithium secondary battery according to the present invention are significantly improved.

MODE FOR CARRYING OUT THE INVENTION

Figure 1:
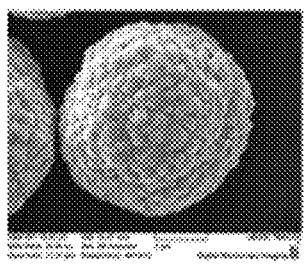
FIG. 1 illustrates SEM images of the cathode active material particles produced in Examples 1 to 5 and Comparative Example 1 of the present invention.
Figure 1:
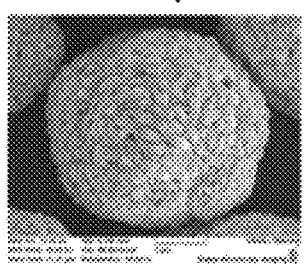
Figure 1:
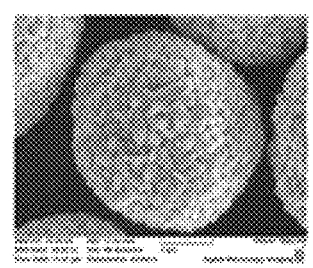
Figure 1:
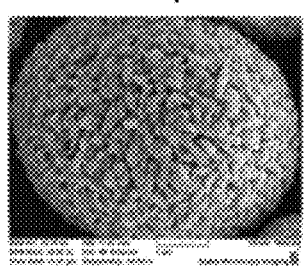
Figure 1:
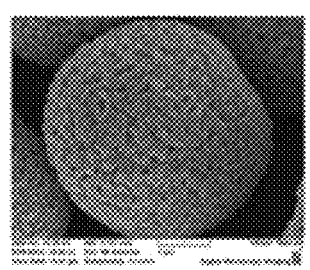
Figure 1:
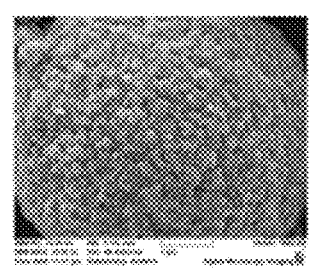

Hereinafter, the present invention will be described in more detail with reference to Examples. However, the present invention is not limited by the following Examples.

Example 1

As the first step, 20 L of distilled water and 1000 g of ammonia as a chelating agent were introduced into a co-precipitation reactor (output of rotary motor: 80 W or more) having an internal volume of 100 L and stirred at from 300 to 1000 rpm using the motor while maintaining the internal temperature of the reactor at from 40 to 50° C.

As the second step, a 2.5 M aqueous solution of the first precursor prepared by mixing nickel sulfate, cobalt sulfate, and manganese sulfate at a molar ratio of 80:20:0 and a 28% aqueous ammonia solution were continuously introduced into the reactor at a rate of 2.2 L/hr and 0.15 L/hr, respectively. In addition, in order to adjust the pH, a 25% aqueous solution of sodium hydroxide was supplied thereto so that the pH was maintained at from 11.3 to 11.4. The impeller speed was adjusted to from 300 to 1000 rpm. The aqueous solution of the first precursor, ammonia, and the aqueous solution of sodium hydroxide were continuously introduced into the reactor in an amount of 38 L.

As the third step, a 2.5 M aqueous solution for forming the concentration gradient layer was prepared by mixing nickel sulfate, cobalt sulfate, and manganese sulfate at a molar ratio of 35:20:45 was introduced into a separate stirrer, in which the volume of the 2.5 M aqueous solution of the first precursor prepared by mixing nickel sulfate, cobalt sulfate, and manganese sulfate at a molar ratio of 80:20:0 in the second step was fixed at 10 L, other than the above reactor at a rate of 2.2 L/hr and stirred to prepare an aqueous solution of the second precursor, and the aqueous solution of the second precursor was introduced into the above reactor at the same time. The aqueous solution for forming the concentration gradient layer was introduced into the reactor while mixing until the molar ratio of nickel sulfate, cobalt sulfate, and manganese sulfate in the aqueous solution of the second precursor became 40:20:40 of the concentration of the shell layer, the 28% aqueous ammonia solution was introduced at a rate of 0.08 L/hr, and the pH was maintained at from 11.3 to 11.4 by introducing the aqueous solution of sodium hydroxide. The amount of the aqueous solution the second precursor, ammonia, and the aqueous solution of sodium hydroxide introduced at this time were 24 L.

Next, as the fourth step, the aqueous solution of the third precursor prepared by mixing nickel sulfate, cobalt sulfate, and manganese sulfate at a molar ratio of 40:20:40 was introduced into the reactor until the volume became 8 L, and the precipitate of spherical nickel-manganese-cobalt composite hydroxide was collected from the reactor after the reaction was terminated.

The composite metal hydroxide precipitated was filtered, washed with pure water, and then dried in a hot air dryer at 100° C. for 12 hours, thereby obtaining a precursor powder in the form of a composite metal hydroxide composed of an inner core layer of $(Ni_{0.8}Co_{0.20})(OH)_2$ and an outer shell layer having a continuous concentration gradient from $(Ni_{0.80}Co_{0.20})(OH)_2$ to $(Ni_{0.4}Co_{0.2}Mn_{0.4})(OH)_2$.

The composite metal hydroxide of the precursor and lithium hydroxide (LiOH.H$_2$O) were mixed together at a molar ratio of 1:1.00 to 1.10, then heated at a temperature rising rate of 2° C./min, then subjected to the heat treatment at 550° C. for 10 hours, and then fired at 750° C. for 20 hours, thereby obtaining the powder of a cathode active material composed of an inner core layer of $Li(Ni_{0.80}Co_{0.20})O_2$ and an outer shell layer having a continuous concentration gradient from $Li(Ni_{0.80}Co_{0.20})O_2$ to $Li(Ni_{0.4}Co_{0.2}Mn_{0.4})O_2$.

Example 2

The powder of a cathode active material was produced by the same method as in Example 1 except that the composition of the inner core layer was $Li(Ni_{0.70}Co_{0.30})O_2$ and the composition of the outer shell layer had a continuous concentration gradient from $Li(N_{0.70}Co_{0.30})O_2$ to $Li(Ni_{0.4}Co_{0.2}Mn_{0.4})O_2$.

Example 3

The powder of a cathode active material was produced by the same method as in Example 1 except that the composition of the inner core layer was $Li(Ni_{0.80}Co_{0.20})O_2$ and the composition of the outer shell layer had a continuous concentration gradient from $Li(Ni_{0.80}Co_{0.20})O_2$ to $Li(Ni_{0.35}Co_{0.35}Mn_{0.3})O_2$.

Example 4

The powder of a cathode active material was produced by the same method as in Example 1 except that the composition of the inner core layer was $Li(Ni_{0.90}Co_{0.10})O_2$ and the composition of the outer shell layer had a continuous concentration gradient from $Li(Ni_{0.90}Co_{0.10})O_2$ to $Li(Ni_{0.33}Co_{0.33}Mn_{0.33})O_2$.

Example 5

The powder of a cathode active material was produced by the same method as in Example 1 except that the composition of the inner core layer was $Li(Ni_{0.97}Co_{0.03})O_2$ and the composition of the outer shell layer had a continuous concentration gradient from $Li(Ni_{0.97}Co_{0.03})O_2$ to $Li(Ni_{0.5}Co_{0.2}Mn_{0.3})O_2$.

Comparative Example 1

Into a co-precipitation reactor (volume: 70 L), 60 L of distilled water and 1000 g of ammonia as a chelating agent were introduced and stirred at 6000 rpm using the motor while maintaining the internal temperature of the reactor at from to 50° C. In addition, nitrogen gas was continuously supplied to the reactor at a flow rate of 3 L/min. Next, a 1 M aqueous precursor solution prepared by mixing nickel sulfate, cobalt sulfate, and manganese sulfate at a molar ratio of 8:1:1 and a 28% aqueous ammonia solution were continuously introduced into the reactor at a rate of 6.5 L/hr and 0.6 L/hr, respectively. In addition, in order to adjust the pH, a 25% aqueous solution of sodium hydroxide was continuously supplied to the liquid surface in the reactor at a rate of from 1.5 to 2.0 L/hr so as to have a pH of from 11 to 12. The temperature of the reaction solution was maintained at 50±2° C. In 30 hours after the inside of the reactor reached a steady-state, the hydroxide particles discharged from the overflow pipe were continuously collected, washed with water, dried in a hot air dryer at 100° C. for 12 hours, thereby obtaining a precursor powder in the form of a composite metal hydroxide of $(Ni_{0.8}Co_{0.1}Mn_{0.1})(OH)_2$.

The composite metal hydroxide and lithium hydroxide $(LiOH.H_2O)$ were mixed together at a molar ratio of 1:1.00 to 1.10, then heated at a temperature rising rate of 2° C./min, then subjected to the heat treatment at 550° C. for 10 hours, and then fired at 750° C. for 20 hours, thereby obtaining the powder of a cathode active material.

<Experimental Example> Taking of SEM Image

Figure 2:
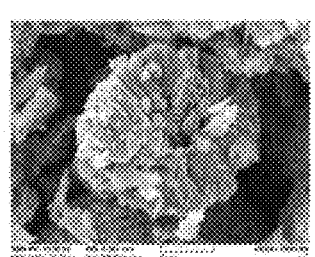
FIG. 2 illustrates the results of the fracture surfaces of the cathode active material particles produced in Examples 1 to 5 and Comparative Example 1 of the present invention taken as SEM images.
Figure 2:
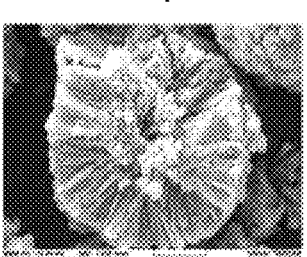
Figure 2:
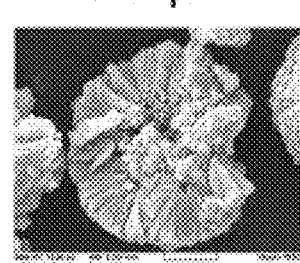
Figure 2:
Figure 2:
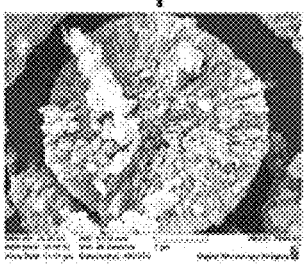
Figure 2:
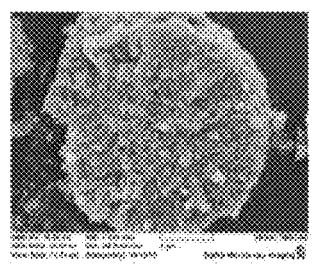

SEM images of the particles and fracture surfaces of the cathode active materials produced in Examples 1 to 5 and Comparative Example 1 were taken and the results are illustrated in FIG. 1 and FIG. 2.

From FIG. 1, it can be seen that the cathode active material particles produced in Examples 1 to 5 and Comparative Example 1 are spherical secondary particles formed by aggregation of the primary particles.

From FIG. 2 of SEM images of the fracture surfaces of the particles, it can be seen that, in the case of the particles produced in Examples to 5 of the present invention, the aspect ratio of the primary particles is 1 or more, the primary particles grow in the longitudinal direction, namely the longer direction to exhibit directivity in the center direction of the particles, and thus the lithium conduction path from the surface to the center of the particles is formed as a one-dimensional or two-dimensional tunnel structure, but in the case of Comparative Example, the aspect ratio of the primary particles is much shorter than that in Examples, the particles are randomly formed, and thus directivity of the primary particles is not observed in the inside of the secondary particles.

<Experimental Example> Taking of TEM Image

Figure 3:
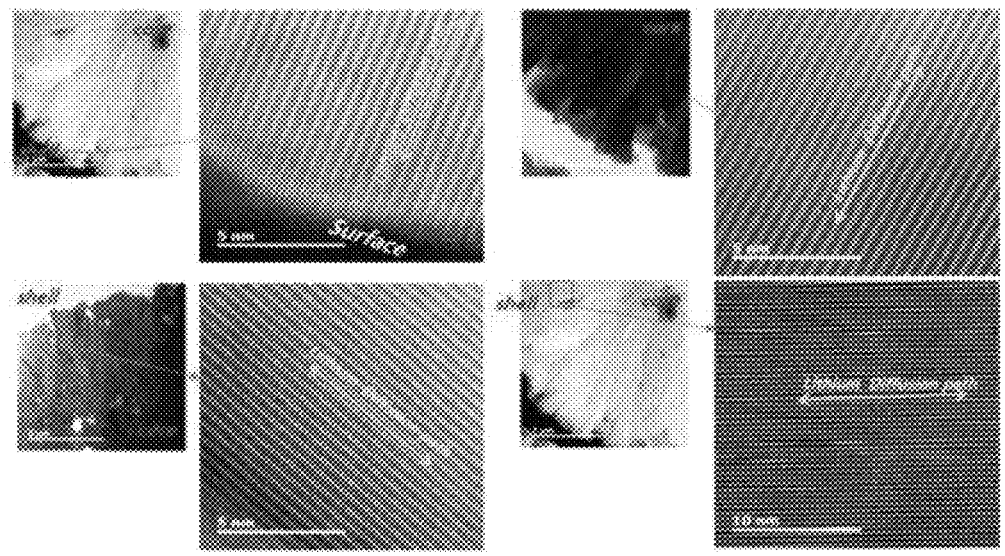
FIG. 3 and FIG. 4 illustrate the results of the shape and structure of the primary particles in the particles of Example 3 and Comparative Example 1 of the present invention taken using a TEM.
Figure 4:
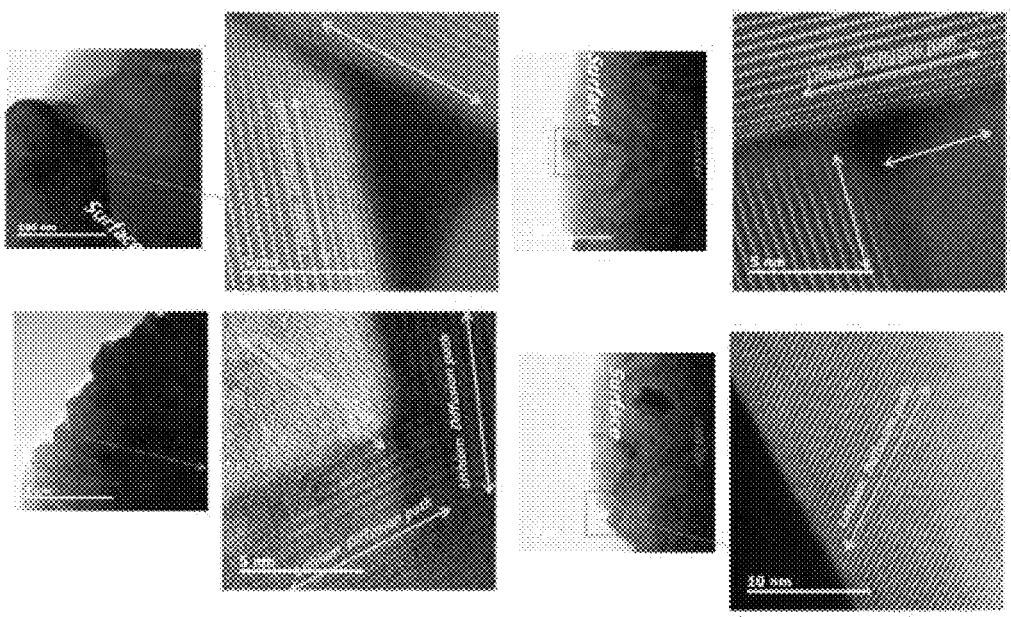

The shape and structure of the primary particles in the particles of Example 5 and Comparative Example 1 were determined by TEM, and the results are illustrated in FIG. 3 and FIG. 4, respectively.

From FIG. 3, it can be confirmed that the primary particles of the particles produced in Example 5 of the present invention are formed to exhibit directivity in the center direction and the lithium ion conduction path in the primary particles is formed to be parallel to the center direction of the secondary particles.

*84

On the other hand, as illustrated in FIG. 4, in the case of the particles produced in Comparative Example 1 of the present invention, it can be confirmed that the lithium ion conduction path in the primary particles is randomly formed without exhibiting directivity.

*86

<Experimental Example> Taking of EDX Image

Figure 5:
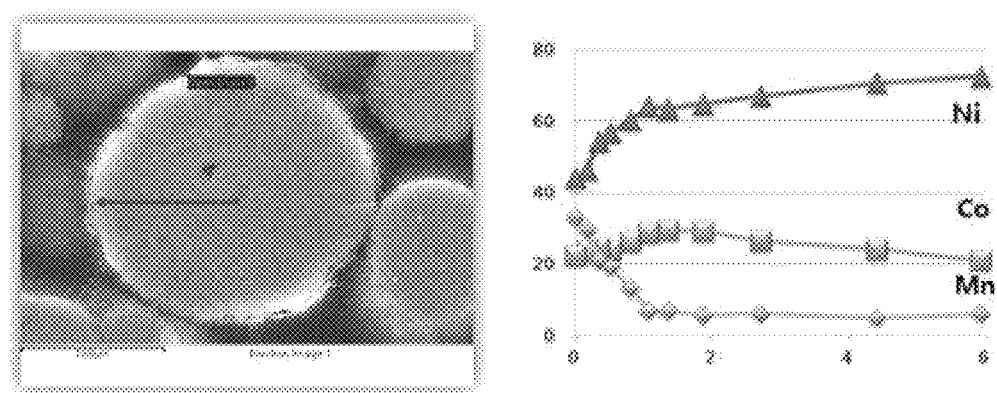
FIG. 5 illustrates the results of the internal composition of the particles produced in Example 3 of the present invention determined by EDX.
Figure 6A:
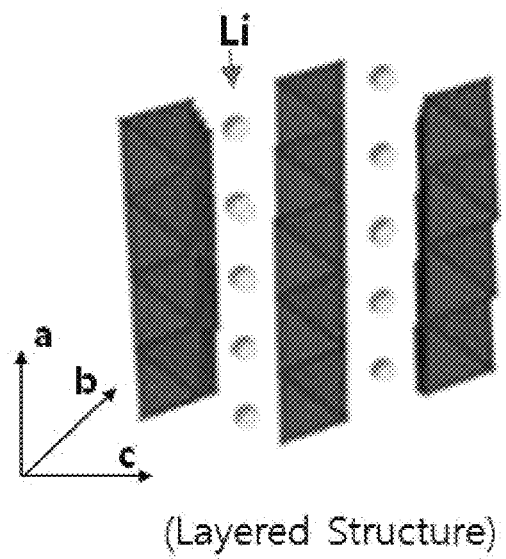
FIG. 6($a$) is a schematic diagram illustrating the layered structure of the cathode active material for lithium secondary battery according to the present invention, and FIG. 6($b$) is a schematic diagram illustrating the shape of the particle cross-section and the lithium ion diffusion path of the primary particles.
Figure 6B:
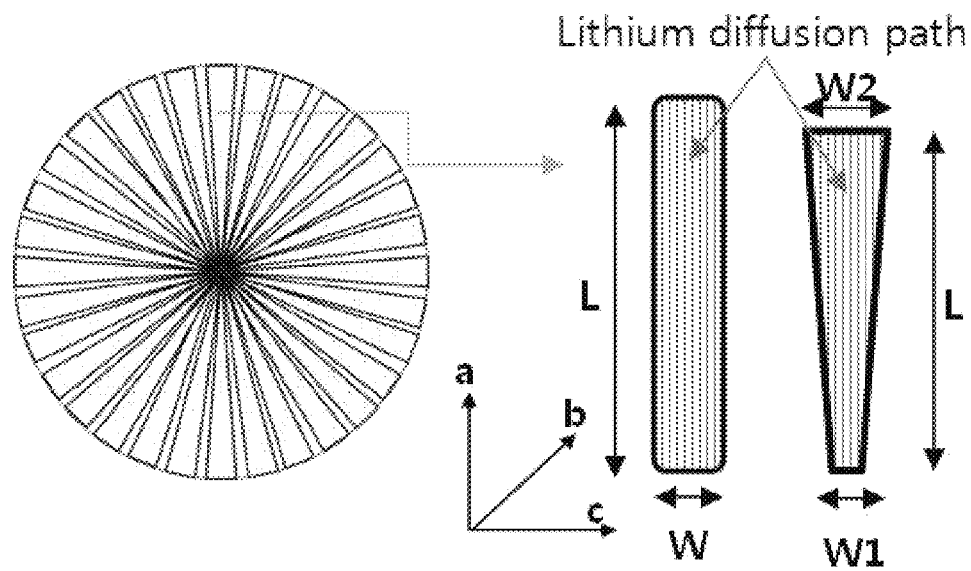
Figure 7:
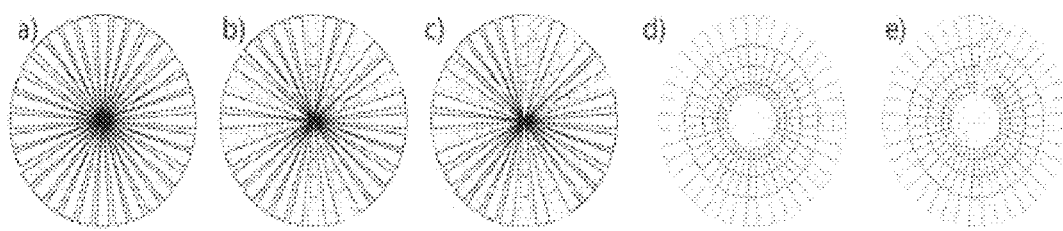
FIG. 7 is a schematic diagram illustrating the cross-section of the primary particles according to the present invention.

The internal composition of the particle produced in Example 3 was determined by EDX and the results are illustrated in FIG. 5.

From FIG. 5, it can be confirmed that, in the case of the particles produced in Example of the present invention, nickel, cobalt, and manganese have a concentration gradient from the center to the surface of the particles.

<Experimental Example> Measurement of Properties of Particles

The composition and particle size distribution of the lithium-metal composite oxide produced in Examples 1 to 5 and Comparative Example 1 were determined using a particle size analyzer, and the results are presented in the following Table 1.

For the composition analysis, a certain amount (about 2 g) of the lithium-metal composite oxide produced above was accurately weighed (0.1 mg unit) and then transferred to a Glass Beaker, aqua regia ($HCl:HNO_3=3:1$) was added thereto, and the lithium-metal composite oxide was completely decomposed on a hot plate.

The intensity of the standard solution (three kinds) prepared using the standard solution (Inorganic Venture, 1000 mg/kg) was measured at the specific wavelength for each element of Li/Ni/Co/Mn using an inductively coupled plasma atomic emission spectrometer (ICP-AES, Perkin-Elmer 7300) to create a standard calibration curve, the pre-treated sample solution and the reference sample were then introduced into the apparatus, the intensity of each of them was measured, the actual intensity was calculated, and the concentration of each component was calculated with respect to the calibration curve created above and normalized so that the total sum became the theoretical value, thereby analyzing the composition of the lithium-metal composite oxide.

TABLE 1

| Division | BET m2/g | Result of ICP (mole %) | | | Result of particle size (μm) | | |
|---|---|---|---|---|---|---|---|
| | | Ni | Co | Mn | D10 | D50 | D90 |
| Example 1 | 0.59 | 54.7 | 20.6 | 24.7 | 8.5 | 11.5 | 15.2 |
| Example 2 | 0.58 | 60.4 | 25.5 | 13.9 | 8.2 | 10.7 | 13.7 |
| Example 3 | 0.55 | 65.1 | 24.4 | 10.4 | 7.6 | 10.2 | 13.3 |
| Example 4 | 0.51 | 70.2 | 17.5 | 12.3 | 8.5 | 11.0 | 14.2 |
| Example 5 | 0.49 | 80.3 | 8.8 | 10.9 | 7.5 | 11.3 | 14.7 |
| Comparative Example | 0.49 | 81.1 | 9.7 | 9.2 | 7.1 | 10.7 | 14.4 |

<Production Example> Production of Battery

The cathode active materials produced in Examples 1 to 5 and Comparative Example 1, super-P as a conductive agent, and polyvinylidene fluoride (PVdF) as a binder were mixed together at a weight ratio of 92:5:3 to prepare a slurry.

The slurry was uniformly coated on an aluminum foil having a thickness of 15 μm and vacuum-dried at 135° C. to produce an anode a cathode for lithium secondary battery.

A coin battery was produced according to a usually known manufacturing process using the cathode, a lithium foil as a counter electrode, a porous polyethylene film (Celgard 2300 manufactured by Celgard, LLC., thickness: 25 μm) as a separator, and a liquid electrolytic solution in which LiPF6 was dissolved at a concentration of 1.15 M in a solvent prepared by mixing ethylene carbonate and ethylmethyl carbonate at a volume ratio of 3:7.

<Experimental Example> Measurement of Properties of Battery

The initial capacity, initial efficiency, rate characteristics, and lifespan characteristics of the battery produced using the active materials produced in Examples 1 to 5 and Comparative Example 1 were measured, and the results are presented in the following Table 2.

From Table 2 below, it can be confirmed that the properties of the batteries including the active materials produced in Examples of the present invention are more significantly improved than those of the battery including the active material produced in Comparative Example.

TABLE 2

| Division | Li/M ratio | Initial capacity (mAh/g) Charge quantity | Initial capacity (mAh/g) Discharge quantity | Initial efficiency Eff. (%) | Rate characteristics % (2 C/0.1 C) | Lifespan performance % at 100$^{th}$ cycle |
|---|---|---|---|---|---|---|
| Example 1 | 1.06 | 184.4 | 169.4 | 91.9 | 87.1 | 97.9 |
| Example 2 | 1.06 | 191.0 | 178.5 | 93.5 | 84.8 | 98.4 |
| Example 3 | 1.06 | 198.2 | 186.6 | 94.1 | 84.3 | 96.9 |
| Example 4 | 1.05 | 207.8 | 190.4 | 91.6 | 85.0 | 99.2 |
| Example 5 | 1.04 | 223.4 | 197.9 | 88.6 | 88.5 | 92.3 |
| Comparative Example 1 | 1.04 | 227.1 | 203.9 | 89.8 | 82.5 | 81.4 |

INDUSTRIAL APPLICABILITY

As described above, it can be said that the cathode active material for lithium secondary battery according to the present invention is significantly useful in that the lithium ion diffusion path in the primary particles is formed to exhibit directivity toward the center direction of the particles, thus the storage of the lithium ion into and release thereof from the primary particles are facilitated, and the capacity, output, and lifespan characteristics of the battery including the cathode active material for lithium secondary battery according to the present invention are significantly improved.

What is claimed is:

1. A positive electrode active material for lithium secondary battery comprising:
    secondary particles formed by aggregation of primary particles,
    wherein a lithium ion diffusion path formed in an interior of the primary particles, measured by transmission electron microcopy, is formed in a center direction of the secondary particles, and
    wherein the secondary particles comprise:
    a core layer having a constant transition metal concentration;
    a concentration gradient layer that is formed on a periphery of the core layer and has a concentration gradient due to a continuous change in concentration of one or more transition metals; and
    a shell layer that is formed on a periphery of the concentration gradient layer and has a constant transition metal concentration,
    wherein an aspect ratio of the primary particles is 1 or more and the lithium ion diffusion path in the primary particles is formed in a longitudinal direction of the primary particles,
    wherein the primary particles are formed to exhibit directivity in the center direction of the entire primary particles, a lithium ion diffusion path in the primary particles is formed in a center direction of the entire secondary particles, and thus a lithium ion diffusion path from a surface to a center of the secondary particles has a one-dimensional or two-dimensional tunnel structure,
    wherein the core layer of the secondary particles is represented by the following Formula (1); and
    wherein the shell layer of the secondary particles is represented by the following Formula (2); and $$Li_{x1}Ni_{1-a1-b1-c1}Co_{a1}Mn_{b1}Me_{c1}O_{2y-1}X_{y1} \qquad <Formula\ 1>$$

(in Formula 1, 0.95≤x1≤1.15, 0≤a1≤0.20, 0≤b1≤0.20, 0≤c1≤0.1, 0≤y1≤0.1, Me is at least one or more elements selected from the group consisting of Al, Mg, B, P, Ti, Si, Zr, Ba and any combination thereof, and X is at least one or more elements or molecules selected from the group consisting of anions of F, BO₃, and PO₄) and $$Li_{x2}Ni_{1-a2-b2-c2}Co_{a2}Mn_{b2}Me_{c2}O_{2-y2}X_{y2} \qquad <Formula\ 2>$$

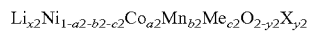

(in Formula 2, 0.95≤x2≤1.15, 0≤a2≤0.50, 0≤b2≤0.60, 0≤c2≤0.2, 0≤y2≤0.1, Me is at least one or more elements selected from the group consisting of Al, Mg, B, P, Ti, Si, Zr, Ba and any combination thereof, and X is at least one or more elements or molecules selected from the group consisting of anions of F, BO₃, and PO₄), wherein in Formula 1, b1=0, and wherein in Formulas 1 and 2, the difference between the Ni content in the core layer and the Ni content in the shell layer of the secondary particles is 0.3 or more, and
wherein a thickness of the shell layer is from 0.05 to 2.0 μm.

2. The positive electrode active material for lithium secondary battery according to claim 1, wherein an area occupied by the primary particles having the aspect ratio of 1 or more and the lithium ion diffusion path in the primary particles formed in a longitudinal direction of the primary particles is from 20% to 100% of a total area of the secondary particle surface.

3. A lithium secondary battery comprising the positive electrode active material for lithium secondary battery according to claim 2.

4. The positive electrode active material for lithium secondary battery according to claim 1, wherein the lithium ion diffusion path in the primary particles inclines by ±45° or less with respect to the center direction of the secondary particles.

5. A lithium secondary battery comprising the positive electrode active material for lithium secondary battery according to claim 4.

6. The positive electrode active material for lithium secondary battery according to claim 1, wherein an area occupied by primary particles having a lithium ion diffusion path directed toward the center direction of the secondary particles is 40% or more of a total area of the secondary particle surface.

7. A lithium secondary battery comprising the positive electrode active material for lithium secondary battery according to claim 6.

8. The positive electrode active material for lithium secondary battery according to claim 1, wherein a lithium ion diffusion path of primary particles of the concentration gradient layer is directed toward a center direction of secondary particles.

9. A lithium secondary battery comprising the positive electrode active material for lithium secondary battery according to claim 8.

10. The positive electrode active material for lithium secondary battery according to claim 1, wherein the primary particles have a needle shape, a plate shape, a rectangular shape, a slanted rectangular shape, or a circular column shape.

11. A lithium secondary battery comprising the positive electrode active material for lithium secondary battery according to claim 10.

12. A lithium secondary battery comprising the positive electrode active material for lithium secondary battery according to claim 1.

13. The positive electrode active material for lithium secondary battery according to claim 1, wherein in Formula 1, b1=0, and wherein in Formula 2, the content of Ni in the shell layer of the secondary particles is 0.4 or less.

* * * * *